Nov. 26, 1963  E. J. G. P. DELOBELLE  3,111,976
TIRE BEAD STRUCTURE

Filed March 8, 1961  3 Sheets-Sheet 1

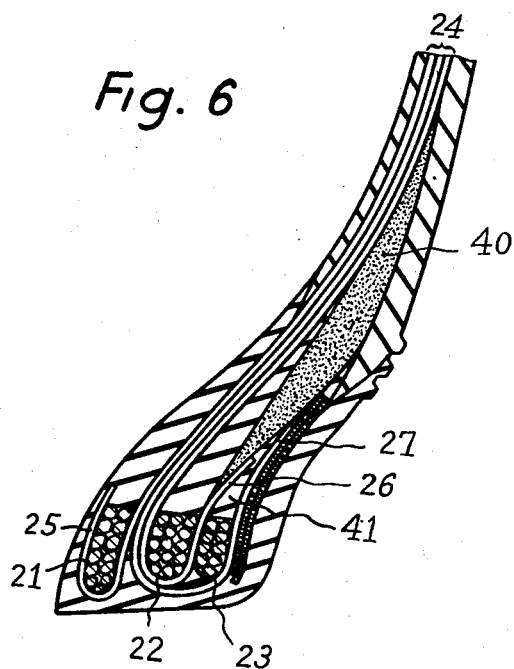
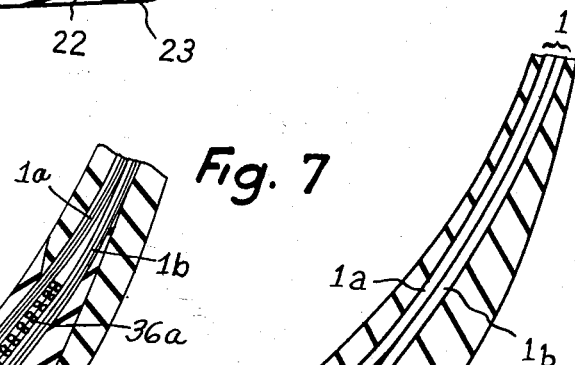
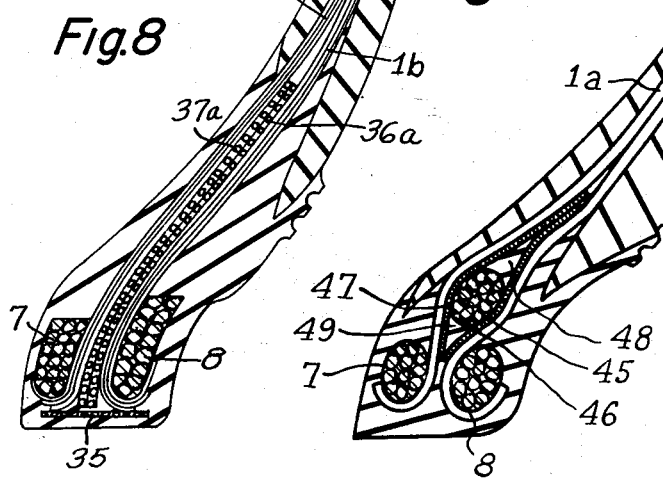

United States Patent Office 3,111,976
Patented Nov. 26, 1963

3,111,976
TIRE BEAD STRUCTURE
Emile Jean Gustave Philippe Delobelle, Colombes, France, assignor to Societe Anonyme dite: Pneumatiques et Caoutchouc Manufacture Kleber Colombes, Colombes, France
Filed Mar. 8, 1961, Ser. No. 94,250
Claims priority, application France Mar. 10, 1960
12 Claims. (Cl. 152—362)

This invention relates to pneumatic tires and is more especially concerned with the bead structures of the tire. It is a general object hereof to provide an improved arrangement of the reinforcing plies in a tire carcass in the bead sections of the tire as well as improved means of securing the plies about the bead reinforcing wires.

In a tire there are generally provided a plurality of plies of reinforcement each comprising rubberized and/or cord fabric made up of textile and/or wire cables juxtaposed in a planar surface and bonded into an integral whole with rubber compound. The carcass plies are usually attached to the bead reinforcing wires by a procedure involving, dividing the plies into separate groups above the bead wires and spreading out the groups of plies around the bead wires so that the various groups extend around a common bead wire in opposite directions or around two adjacent bead wires in a common direction. Thus with the conventional arrangement the reinforcing plies are spread apart and spaced from one another within an area in which they are exposed during the tire manufacturing process and in service to high stresses developed in the tire sidewalls above the points at which they are actually secured. The turned-over end portions of the plies are not exposed to such stresses. There are thus generated differential strains in the respective ply portions and this is clearly detrimental to the proper behavior of the tire and reduces its useful service life.

In an attempt to overcome the difficulty it has been suggested to turn over all of the plies together so as to form a fold in which a single bead reinforcement wire is enfolded. However such an arrangement does not impart sufficient strength to the bead effectively to oppose slippage of the plies during the tire manufacturing process as the tire is deformed to convert it from the shape of a cylindrical blank to its final toroidal form, so that the plies then tend to slip relative to the bead wire. The term bead wire as used in this description and in the appended claims is intended to be construed as inclusive of a bead reinforcement core formed of a single ring of wire, a ring formed of a plurality of convolutions of a single wire, or a ring formed of a bundle of separate wires.

It is an object of this invention to provide an improved tire bead reinforcement structure whereby the behavior of the carcass plies during the tire building and shaping process and throughout service is greatly improved in that the plies remain grouped as a unit throughout the area in which they are exposed to stress. Another object is to provide such a tire bead structure in which the bead will respond by a self-locking effect to any tension exerted on the carcass plies.

According to the invention there is provided an improved tire bead structure comprising at least two bead wires in each bead section of the tire, and wherein the set of reinforcement plies all extend in closely adjacent relationship from one pair of bead wires to the other, being all inserted adjacent each end of said plies between a related pair of said wires, and the set of plies being separated apart beyond each pair of bead wires into two groups each said group being folded outwards around a respective wire of the pair.

It will be understood that with the arrangement described there is in effect provided a wedging relationship as between the groups of plies folded around each bead wire thereby providing the desired self-locking action in response to a pulling stress applied to the reinforcement plies.

In one form of the invention each bead section of the tire may include more than two wires, e.g. three wires, in which case the entire set of reinforcement plies in each bead section is inserted between two adjacent wires and then spread apart beyond said wires into at least two separate groups equal to that of the wires in the bead section, and then folded around a respective one of said wires so that one or more of the groups of plies on at least one side of the main set of plies enfolds or envelops one or more other of said groups.

The invention is advantageously applied to tire casings of the type wherein the carcass reinforcement plies are disposed with the constituent wires or cords thereof extending generally on radial planes of the tire casing. In such a radial-reinforcement type of tires there is considerably greater flexibility in the sides of the tire casing than in the more conventional type of casing in which the direction of the constituent cords or wires are crossed as between one ply and an adjacent ply. While this is an important advantage in regard to driving comfort, a drawback is also present in that the side walls of the tire casing are exposed to repeated alternating flexing stresses in the areas thereof adjacent the beads so that damage by ply separation and tears is frequently found to occur. The bead reinforcing structure of the invention when applied to this type of radial-reinforcement tire tends to minimize this defect since the fact that all the plies remain grouped together as far as the bead wires enables the carcass more readily to withstand repeated alternating flexing stresses in and adjacent the bead sections.

A detailed description of the invention will now be made with reference to specific embodiments thereof given by way of non-restrictive examples and illustrated in the accompanying drawings, wherein.

Figure 4:
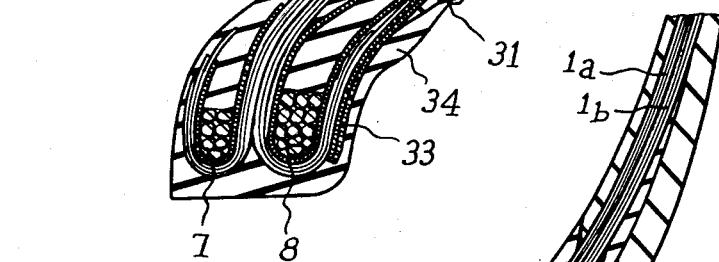
Figure 5:
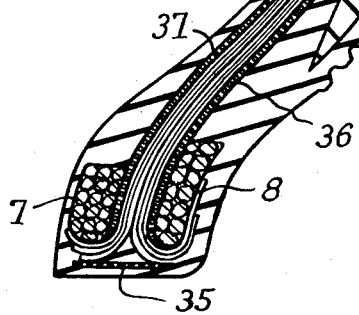

FIG. 4 similarly shows another modified bead structure comprising two bead wires and a damping pad insert between the reinforcement plies and the filling of the outer bead wire;

FIG. 5 is a similar view of a modification comprising two bead wires with a minimum length of fold-over;

FIG. 6 is a similar view of a modification employing three bead wires;

FIG. 7 similarly illustrates another modification using two main bead wires and an additional locking wire; and FIG. 8 is a view similar to FIG. 5 but showing a modification with reinforcing strips between the groups of carcass plies.

Figure 1:
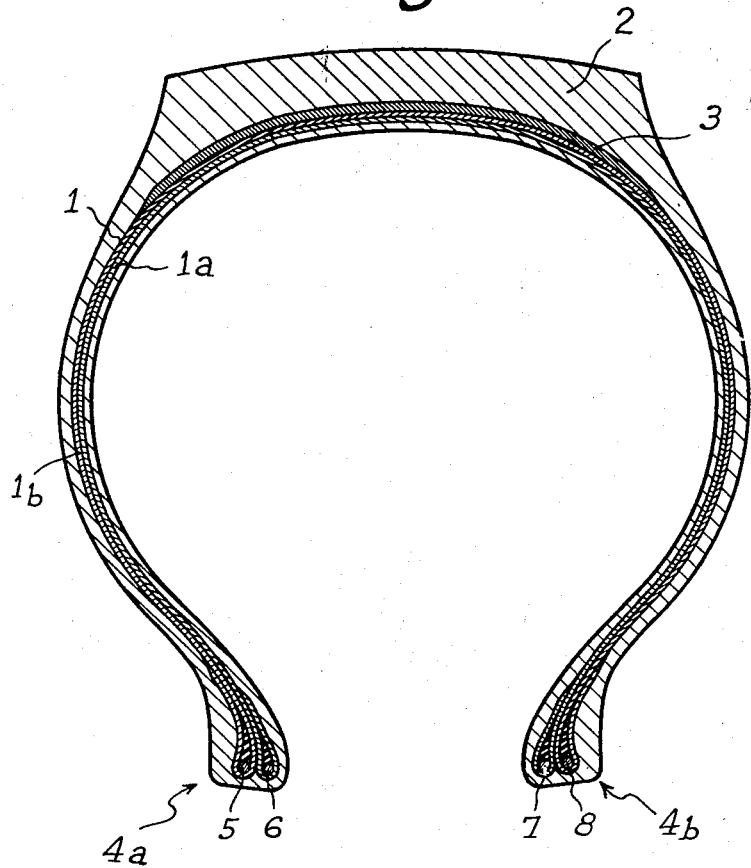
FIG. 1 is a cross sectional view of a tire provided with the improved bead structure, using two bead wires.

Referring first to the embodiment of the invention shown in FIG. 1, this comprises a tire carcass 1 consisting of a set of two groups of reinforcement plies 1a and 1b, a tire tread 2, a tread protector element 3 underlying the tire tread, and bead sections 4a and 4b each containing two bead reinforcement wires 5 and 6 or on one side and 7 and 8 on the other. The pairs of wires 5—6 and 7—8 are each positioned on opposite sides of the unitary group of plies comprising the carcass. The plies are thus grouped until final attachment around the bead wires. For such final attachment the group of plies 1a are folded inwardly of the tire around the bead wires 6 and 7 in the respective bead sections, while the group of plies 1b are folded outwardly of the wire around the wires 5 and 8 in each bead section. As well known each bead wire 5, 6—7, 8 include a filler strip of hard rubber compound.

Figure 2:
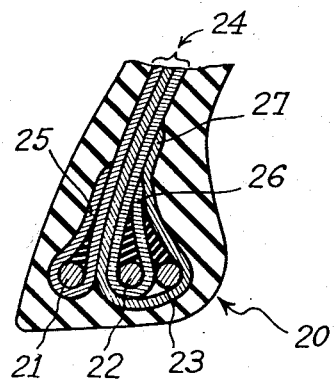
FIG. 2 is a partial sectional view of a modified bead structure using three bead wires.

In the modification shown in FIG. 2 the bead 20 is shown as including the three wires 21, 22 and 23 therein. The carcass 24 comprises a set of plies all of which are inserted in accordance with the main teaching of the invention in between the wires 21 and 22 and are then spread apart. As shown the plies are here separated into three groups 25, 26 and 27. The inner group of plies 25 are folded around wire 21 inwardly of the tire and the outer ply group 26 is folded around wire 22 outwardly of the tire. Bead wire 23 is then applied against the outer surface of the folded ply group 26 and the outer end of the intermediate group of plies 27 is finally folded around this outermost wire 23 outwardly of the tire. As well known each bead wire 21, 22 and 23 includes a filler strip of hard rubber compound.

It will be noted that in each of the improved bead structures described so far a widge-like formation is provided as between the respective groups of plies, i.e. groups 1a and 1b in FIG. 1, and groups 25 and 26—27, FIG. 2, which groups are folded around a related wire, thereby resulting in a self-locking action on tensional force being exerted on the reinforcement carcass and preventing the plies from slipping relatively to the wires on deformation of the tire casing during the shaping step in the tire manufacturing process. Since the plies all remain firmly assembled with one another from one tire bead to the other bead, the resulting tire casing will have a high degree of homogeneity and any strains developed therein during manufacture and service will be evenly distributed, thus considerably improving operating characteristics, without any corresponding increase in manufacturing costs since the quantity and quality of the materials used per tire are not substantially changed from what is conventionally required.

Figure 3:
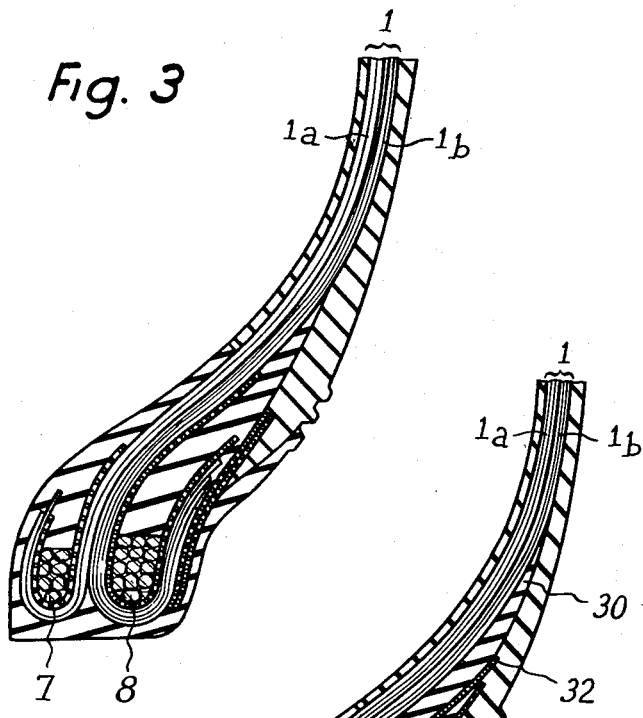
FIG. 3 is a similar view of a modification using two bead wires and unequal groups of plies.

Referring now to the modified bead structure shown in FIG. 3, this comprises a tire carcass 1 of the so-called radial reinforcement type comprising two groups of plies 1a and 1b which are both inserted at their end portions in between the two bead reinforcement wires 7 and 8. Thus the wires 7 and 8 are positioned on each side of the entire set of plies which therefore remain grouped unitarily and tightly as far as the very bottom end of the bead structure as in the preceding embodiments. In this embodiment the two groups of plies are unequal. Thus, the group 1a that is folded inwardly of the tire around wire 7 is shown as including e.g. two plies while group 1b folded outwardly about wire 8 here comprises e.g. four plies. This embodiment illustrates the fact that it may be advantageous in varoius cases to have a greater number of plies in the group folded outwardly around the bead structure than in the inwardly folded group. Other relationships than the 4/2 relation shown, e.g. 3/1, 2/1, and so forth, may be used depending on the particular application, total number of plies in the carcass, and size of tire. As well known each wire 7, 8 includes a filler strip of relatively hard rubber compound, which fills the space in each fold defined above.

In the modified structure of FIG. 4 the general arrangement is the same as in FIG. 1 or FIG. 3, but there is further provided a relatively flexible pad or cushion of gum or similar compound 30 inserted between the outer group 1b of the carcass and the filling 31 overlying the wire 8 within the fold, which filling 31 may be provided in the per se conventional form of a relatively hard rubber compound profiled section (Shore hardness number e.g. about 80) enclosed within the so-called flipper strip 32 of bead wire 8. The flexible pad 30 provides a damping feature and improves the flexing strength in the lower part of the sidewall of the tire casing adjacent the bead.

Further, both embodiments shown in FIGS. 3 and 4 just described are shown as including one or more strips 33 of preferably metallic cord fabric imbedded in the rubber rim annulus 34 for improving the wear resistance at the inner round-off of the bead section.

In the further modification shown in FIG. 5 the general arrangement is again the same as in FIGS. 3 and 4. However, the folded-over end portions of the two ply groups 1a and 1b extend no further than the bottom outer surfaces of the respective bead wires 7 and 8 rather than rising up to a level substantially higher than the top surfaces of said wires as was the case in all the embodiments so far described. To improve the bond in this modification between the separate ply groups and the wire surfaces there is provided one or more small-sized strips 35 of preferably metallic cord fabric applied against the under surfaces of the portions of ply groups 1a and 1b underlying the wires. In the strip 35 the constituent wires or cables preferably extend at a large angle, e.g. in the range from 70° to 90°, to the radial plane of the tire.

Further in the embodiment of FIG. 5 the bead structure is shown as being reinforced with the semi-flippers or strips 36, 37, preferably made of metallic cord fabric wherein the constituent cords lie at an angle approximating that formed by the cords of the main reinforcement carcass, e.g. at an angle of 70° assuming the carcass is of the radial-reinforcement type earlier referred to, wherein the angle is 90°. The semi-flippers are positioned on opposite sides of the carcass plies and their lower ends are shown inserted between the bead wires 7 and 8 together with said carcass plies. Alternatively, semi-flippers 36a, 37a might be positioned between the groups of carcass plies 1a and 1b with their lower ends being inserted through the bead wires in between said plies, as shown in FIG. 8.

In the embodiment shown in FIG. 6 the bead structure includes three bead wires as in the embodiment earlier described with reference to FIG. 2. The reinforcement carcass 24 comprises a set of plies all of which are inserted in between the bead wires 21 and 22 and then spread apart in a manner generally similar to that shown in FIG. 2. That is, the set of plies is divided into three groups 25, 26, 27; the group 25 is turned over wire 21 inward of the tire, group 26 is turned over wire 22 outward of the tire, wire 23 is applied against the outer surface of group 26 and group 27 is then turned over wire 23 outward of the tire. However, in this embodiment the folded-over ply groups 26 and 27 instead of being applied into engagement with the related surface of the main set of plies 24 as was the case in the embodiment of FIG. 2, are left spaced apart from said related surface of the main set of plies; and in the space thus defined which is partly filled with the filler strip overlying wire 22, there is a pad or cushion of relatively flexible gum compound 40 which at its lower end overlying the filler strip 41 associated with wire 23 merges with the filler strip associated with central wire 22, while at its upper end said pad gradually merges with the tire casing and carcass. The function of this flexible pad 40 is generally the same as that of pad 30 in FIG. 4.

The further embodiment of the invention shown in FIG. 7 comprises a bead structure including two main bead wires 7 and 8 of round or oval cross section and similar diameter. The set of reinforcement plies 1 is again divided into the two groups 1a and 1b, but prior to the two groups being inserted in between the bead wires 7 and 8 and then separated out beyond said wires, as in the foregoing embodiments, the two ply groups 1a and 1b are separated apart above said bead wires and an additional or locking wire 45 is inserted between them; the locking wire 45 is larger in diameter than each of bead wires 7 and 8. With this arrangement the bead section of the tire has rigidity imparted to it over a greater height dimension than in the foregoing embodiments while retaining the requisite flexibility in the side walls of the tire adjacent the bead and such increased bead rigidity is of especial advantage in connection with radial reinforcement tires as earlier indicated. In addition, however, the locking wire 45 which is a characteristic feature of this embodiment serves as wedge blocking the carcass plies against the main bead wires 7 and 8. In this case the length of the folded-over end portions of ply groups 7 and 8 beyond the wires 7 and 8 may be substantially reduced somewhat similar to the embodiment of FIG. 5. Preferably the lock wire 45 is surrounded on both sides with strips 46 and 47 of metallic cord fabric, and the residual spaces above and below the lock wire 45 are filled with suitable profiled strips 48 and 49 of hard rubber compound.

It will be understood that various changes and modifications may be conceived by those familiar with the art in addition to the modifications shown and described, without exceeding the scope of the present invention as defined in the appended claims.

What I claim is:

1. In a tire casing comprising a multi-ply reinforcing carcass extending from one bead section of the tire to the other bead section with the reinforcing elements in the carcass plies extending generally in radial planes of the tire and with bead reinforcing wires in said bead sections, the improvement comprising having all the plies of said carcass extending unitarily in between a pair of said reinforcing wires in each bead section with the said carcass plies divided radially inwardly of said bead wires into separate groups of plies and the end portions of said separate groups of plies folded around respective reinforcing wires of said bead section in opposite directions.

2. In a tire casing comprising a multi-ply reinforcing carcass assembly extending from one bead section of the tire to the other bead section with the reinforcing elements in the separate carcass plies of the assembly extending generally in radial planes of the tire and with a pair of adjacent bead reinforcing wires in each bead section, the improvement comprising having said multi-ply assembly extending unitarily in between said wires in each bead section with the plies of the assembly divided radially inwardly of said bead wires into two separate groups of plies and the end portions of said separate groups of plies folded around said wires in opposite directions.

3. In a tire casing comprising a multi-ply reinforcing carcass assembly extending from one bead section of the tire to the other bead section, the improvement comprising the provision of three adjacent bead reinforcing wires in each bead section with the said multi-ply assembly extending unitarily in between two adjacent ones of said wires, the assembly radially inwardly of said bead wires being divided into three separate groups of plies with the inner group of plies folded around one of said adjacent wires, the outer group folded around the other of said adjacent wires, and the intermediate group folded around the third one of said wires so as to envelop one of said adjacent wires and the ply group folded therearound.

4. In a tire casing comprising a multi-ply reinforcing carcass assembly extending from one tire bead section to the other, an improved bead structure comprising at least a pair of bead reinforcing wires in each bead section, said multi-ply assembly being inserted unitarily between said bead wires and being divided radially inwardly of the bead wires into two separate groups of plies, end portions of said separate groups being folded in opposite directions about said wires and extended adjacent opposite surfaces of said multi-ply assembly above said wires, thereby defining separate spaces above the respective wires at least partly enfolded in said separate groups of plies, filler strips of rubber compound having a Shore hardness number in the order of 80 filling said spaces and a cushioning pad of rubber compound more flexible than said filler strips interposed between at least one of said filler strips and the adjacent surface of said multi-ply assembly.

5. The invention claimed in claim 1, wherein said separate groups include different numbers of plies therein.

6. In a tire casing comprising a multi-ply reinforcing carcass assembly extending from one tire bead section to the other, an improved bead structure comprising at least a pair of bead reinforcing wires in each bead section, said multi-ply assembly being unitarily inserted between said bead wires and being divided radially inwardly of the bead wires into separate groups of plies, end portions of said groups of plies being turned out in opposite directions so as to extend at least over parts of the opposite surfaces of said respective wires, and an additional wire inserted in between the two groups of plies somewhat above the point of insertion of said assembly between said first two wires to lock said groups of plies in position relative to said first wires.

7. In the tire casing claimed in claim 6, strips of reinforcing cord fabric interposed between each side of said additional wire and the adjacent side of the related ply group.

8. In the tire casing claimed in claim 6, filler strips of rubber compound filling the spaces between upper and lower surfaces of said additional wire and adjacent surfaces of said ply groups.

9. In a tire casing comprising a multi-ply reinforcing carcass assembly extending from one tire bead section to the other, an improved bead structure comprising at least a pair of bead reinforcing wires in each bead section, said multi-ply assembly being unitarily inserted between said bead wires and being divided radially inwardly of the bead wires into separate groups of plies, end portions of said groups of plies being turned in opposite directions so as to extend at least over parts of the opposite surfaces of said respective wires, the said separate groups of plies extending not substantially further than the under surfaces of said respective bead wires, and each bead section containing wire locking means for blocking said separate ply groups against said wires.

10. In a tire casing comprising a multi-ply reinforcing carcass assembly extending from one tire bead section to the other, an improved bead structure comprising at least a pair of bead reinforcing wires in each bead section, said multi-ply assembly being unitarily inserted between said bead wires and being divided radially inwardly of the bead wires into separate groups of plies, end portions of said groups of plies being turned in opposite directions so as to extend at least over parts of the opposite surfaces of said respective wires, the said separate ply groups extending not substantially further than the under surfaces of the respective bead wires, and each bead section having a locking strip of wire cords applied against the under surfaces of said groups of plies beneath said wires for blocking the ply groups in position.

11. In a tire casing comprising a multi-ply reinforcing carcass assembly extending from one tire bead section to the other, an improved bead structure comprising at least a pair of bead reinforcing wires in each bead section, said multi-ply assembly being unitarily inserted between said bead wires and being divided radially inwardly of the bead wires into separate groups of plies, end portions of said groups of plies being turned in opposite directions so as to extend at least over parts of the opposite surfaces of said respective wires, and at least one strip of metallic cord fabric upon each of the opposite side surfaces of said multi-ply assembly in each bead section and extending between said bead wires.

12. In a tire casing comprising a multi-ply reinforcing carcass assembly extending from one tire bead section to the other, an improved bead structure comprising at least a pair of bead reinforcing wires in each bead section, said multi-ply assembly being unitarily inserted between said bead wires and being divided radially inwardly of the bead wires into separate groups of plies, end portions of said groups of plies being turned in opposite directions so as to extend at least over parts of the opposite surfaces of said respective wires, and a strip of reinforcing cord fabric embedded in said carcass in each bead section and extending from a location adjacent the outer corner of the bead section radially outwardly in engagement with a folded over end portion of the related ply group.

References Cited in the file of this patent

UNITED STATES PATENTS

| | | |
|---|---|---|
| 1,209,605 | Mell | Dec. 19, 1916 |
| 1,989,956 | Ulrich | Feb. 5, 1935 |
| 2,501,372 | Benson | Mar. 21, 1950 |
| 2,752,980 | Riggs | July 3, 1956 |